United States Patent Office 3,166,633
Patented Jan. 19, 1965

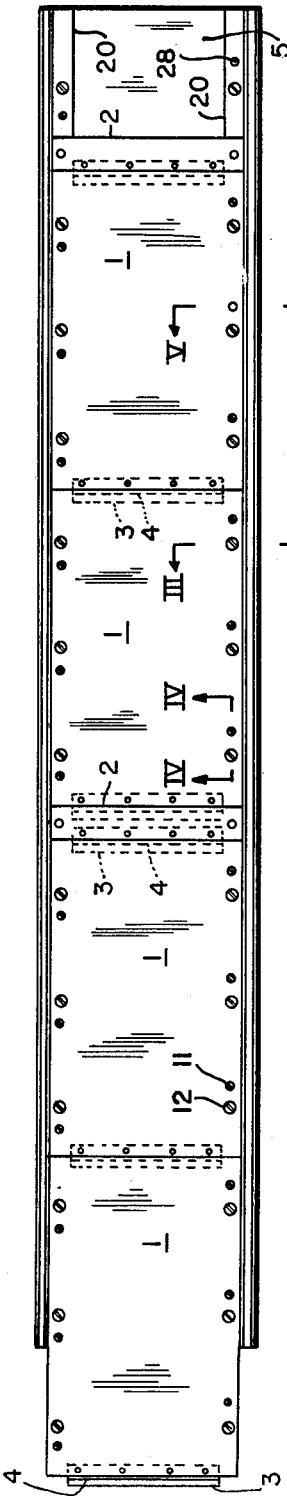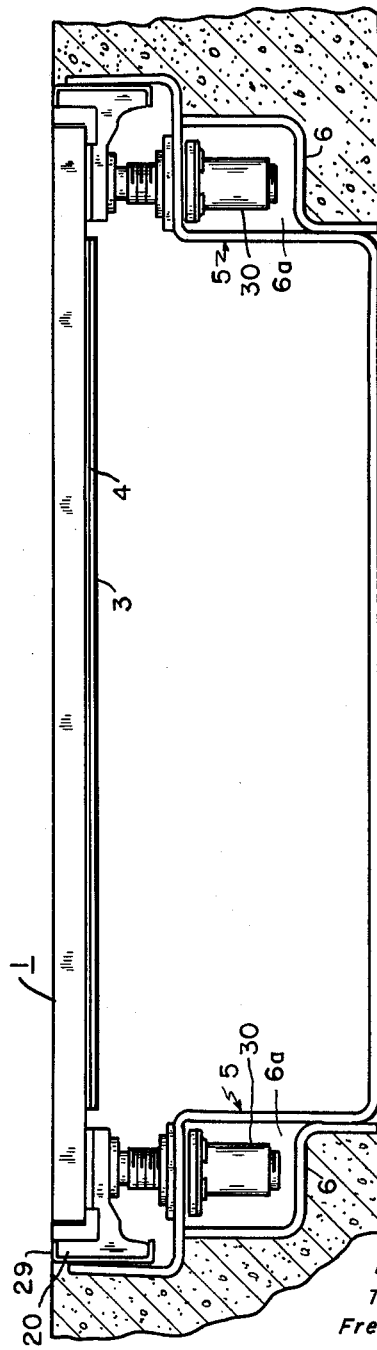

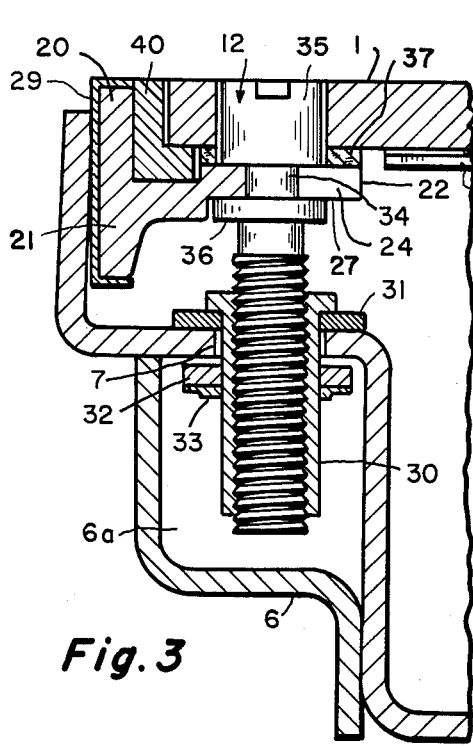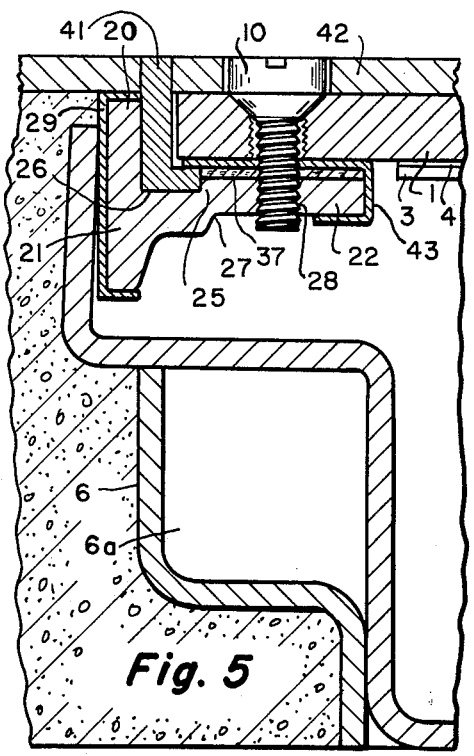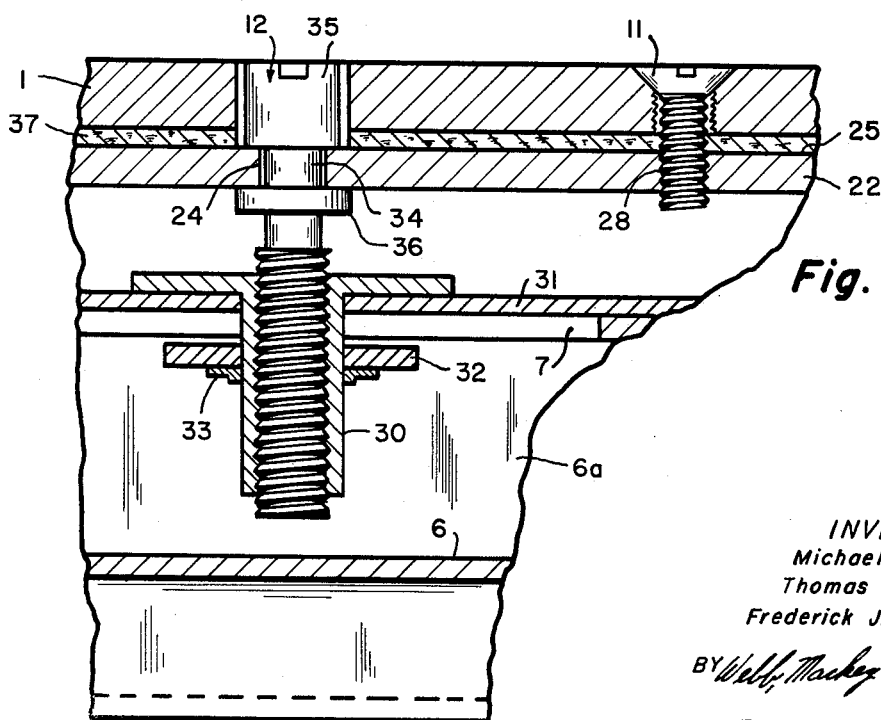

3,166,633
TRENCH DUCT HAVING AN ADJUSTABLE
CLOSURE ASSEMBLY
Michael Guzan, Jr., Ambridge, Thomas E. Hoskins,
Moon Township, Allegheny County, and Frederick J.
O'Reilly, Bethel Park, Pa., assignors to Wheatland
Electric Products Co., Carnegie, Pa.
Filed May 6, 1963, Ser. No. 278,095
11 Claims. (Cl. 174—101)

This invention relates to an underfloor trench duct having an adjustable closure assembly and more particularly to longitudinally and vertically adjustable cover plates for trench ducts used in underfloor wire distributing systems.

The use of underfloor wiring systems is common practice in modern construction, particularly in office buildings, hospitals and other buildings requiring a large number of electrical outlets, as this type of wiring distribution arrangement provides the necessary flexibility for the outlet location. In the past, ducts have been embedded in the poured concrete floor and covered access openings have been provided in the top wall of the duct. When using this type of underfloor duct, it is necessary to fish or pull the wiring through the duct between the access openings when wiring is laid in the duct.

This invention provides a trench duct with an adjustable closure assembly which may be removed throughout the longitudinal extent of the duct in order to provide ready access to the interior of the duct as well as to provide access to any wiring contained therein and thereby eliminates the burdensome job of fishing for the wires in the duct. The closure assembly of this invention may be installed and adjusted on the job with a minimum amount of time and skill. The closure assembly includes cover plates for the trench duct which are adjustable vertically in order to compensate for any deviation in the depth of the poured concrete floor.

Additionally, the closure assembly permits a longitudinal adjustment of the cover plates. Longitudinal adjustment of the cover plates is necessary since it quite often happens in continuous tile laying that the joint between adjacent tiles is not aligned with the joint between adjacent cover plates and if these joints are not aligned the plates may not be easily removed. The longitudinal adjustment of the cover plates also makes it possible to place spacers or modules between adjacent cover plates if desired.

In the accompanying drawings, the preferred embodiment of this invention is shown, in which:

FIGURE 1 is a plan view of a trench duct section having a closure assembly in accordance with the invention;

FIGURE 2 is an end view of the trench duct and closure assembly shown in FIGURE 1;

FIGURE 3 is a section on the line III—III of FIGURE 1;

FIGURE 4 is a section on the line IV—IV of FIGURE 1; and

FIGURE 5 is a section on the line V—V of FIGURE 1 showing floor covering material over the cover plates and the adjacent concrete floor.

The closure assembly shown in FIGURE 1 of the drawings comprises four cover plates 1; the left-hand one of which may be termed a splice cover plate as it includes a portion extending beyond the end of the duct section which is adapted to overlap a portion of the adjacent duct section. At the right-hand end of FIGURE 1, a portion of the duct section is open at the top so as to receive the splice cover plate of the adjacent duct section. A module or spacer plate 2 is shown between two of the cover plates 1 in FIGURE 1. These spacer plates are optional and may be used when the design of the finished floor calls for a metal strip to be permanently affixed between sections of floor covering material. The plate 2 may also be located beneath a wall partition so that the partition does not interfere with the removal of the cover plates 1. The left-hand end of each cover plate 1 and module 2 has a back-up member 3 welded to the undersurface thereof and extending beyond the end of the plate or module. An elongated gasket 4 is placed on the upper surface of back-up member 3. This gasket is made of a highly compressible material and when the end of the adjacent cover plate or spacer is placed on member 3, the gasket provides a water-tight seal thereby preventing any water from flowing into the duct.

The trench duct 5 consists of a bottom wall and a pair of side walls which are embedded in a concrete floor. The upper edge of each of the side walls is formed with a substantially right angle extension which receives elongated adjusting rims 20. A Z-shaped protector member 6 is attached to the outer surface of each side wall below the horizontal leg of the right angle extension in a manner to form a hollow cavity 6a on each side of the duct extending throughout the length thereof. The hollow cavity receives the lower end of a plurality of T-nuts 30 and protects them from contact with concrete so that they can slide on the duct section in a manner described hereinafter.

The closure assembly according to the invention comprises pairs of parallel adjusting rims 20 which fit within the right angle side wall extensions. The adjusting rims are T-shaped in cross-section and have a vertical flange 21 and a horizontal web 22. The horizontal web has inwardly opening notches or slots 24 formed at spaced intervals throughout its longitudinal extent for a purpose to be described hereinafter. The web is upset as shown at 25 providing longitudinal recesses 26 and 27 on the upper and lower surfaces respectively of the web. In addition to the spaced slots 24, each web is provided with a plurality of spaced threaded holes 28 for receiving the floor covering hold-down screws 10, FIGURE 5, or the cover plate hold-down screws 11, FIGURE 4. A comparison of FIGURES 4 and 5 shows that the cover plate screws 11 have flat heads in order to be flush with the upper surface of the plate while the floor covering screws 10 have a raised head which is flush with the surface of the floor covering. It should be understood that screws 10 may be used with any type of floor covering such as linoleum, carpeting or tile. The threaded holes 28 for the hold-down screws are located adjacent the slots 24 as indicated in FIGURE 1. Each cover plate has holes aligned with slots 24 and holes 28 through which adjusting screws 12 and hold-down screws 10 or 11 extend, respectively. In addition to the holes 28 and slots 24, the horizontal web of the adjusting rim 20 may be provided with holes for receiving screws for holding the modules 2 in place when they are used.

As shown in FIGURE 4, the horizontal leg of each right angle side wall extension has elongated slots 7 formed therein underlying the slots 24 in the horizontal webs of the adjusting rims. A T-nut 30 is supported in each slot 7 by being attached to a guide member 31. The guide member 31 is substantially the same length as an adjusting rim 20 and is attached to all of the T-nuts used with the rim in order to facilitate the longitudinal movement of the rim. When the closure is adjusted longitudinally the guide member slides on the upper surface of the horizontal leg of the right angle extension. It is apparent that guide member 31 prevents the T-nuts from rotating when adjusting screws 12 are turned.

A second guide member 32 surrounds each T-nut below the wall of the right angle extension and is held in position on the nut by a cylindrical spring clip 33. The lower guide member prevents the T-nut from pulling upwardly out of the duct extension when screws 12 are turned to raise the cover plates. The manner of supporting the T-nuts on the duct is both simple and economical and provides a firm seat in the slots for the T-nuts. After the T-nuts are assembled in the slots, the members 6 are welded in place and the nuts are thereby protected from contact with the surrounding concrete and can freely slide throughout the length of slots 7. In order to further protect the closure assembly, a U-shaped member 29 having the same length as the duct section is fitted over adjacent adjusting rims on each side of the duct section. These members are adapted to extend to the upper surface of the poured concrete and thereby prevent any concrete from contacting the adjusting rims. The U-shaped members 29 are relatively loosely fitted on rims 20 so that the rims can slide on the inner surface of the member during longitudinal adjustment.

The adjusting screws 12 have grooves 34 in the upper end dimensioned to receive and hold the upset portion of adjusting rims 20 as shown in FIGURES 3 and 4 whereby the adjusting rims can be raised or lowered by turning the adjusting screws in the T-nuts. The upper portion 35 of the screw heads will force the adjusting rims down and the lower portion 36 of the screw heads which engage recess 27 will raise the adjusting rims. In this manner, the level of cover plates supported on the rims can be regulated.

A gasket 37 rests on the upper surface of the upset portion 25 of each adjusting rim. Holes through the gasket permit passage of the screw heads of adjusting screws 12 and the screws 10 or 11. An L-shaped elongated flush pan 40 rests on the inner portion of the upper surface of web 22 of each adjusting rim in recess 26. The cover plates 1 rest on the flush pans and gaskets and are held in place by hold-down screws 10 or 11, depending upon whether or not floor covering is used over the plates and adjacent floor.

Referring specifically to FIGURES 3 and 5, an important feature of the trench duct assembly is the use of two flush pans of different heights in installing the cover plates on the trench duct. The vertical leg of L-shaped flush pans 40 originally installed is dimensioned so that the adjusting rims, flush pan and cover plates terminate in the same horizontal plane. The concrete floor may then be poured around the duct. Any final adjustments in the height of the cover plates can be made so that the surface of the concrete and the top surface of the cover plates are in the same horizontal plane. The cover plates may then be removed and second L-shaped flush pans 41, shown in FIGURE 5, installed. The flush pans 41 are the same length as the duct section and their vertical legs are longer than the vertical legs of flush pans 40 which were originally used by the thickness of the linoleum or other floor covering 42 to be used on the concrete floor. After pans 41 are installed, the floor covering is laid in place. The flush pans 40 are required during the pouring of the concrete to prevent concrete from entering the annular space between the flange of the adjusting rims and the cover plates and to support the plates in the proper horizontal plane. The pans 41 should not be positioned in recesses 26 prior to pouring the concrete floors since they are made of a thin ductile metal which can be easily bent or deformed during the concrete pouring operation.

After the flush pans 41 are positioned in recess 26, clips 43 are fitted over horizontal web 22 of the adjusting rims 20 in the manner shown in FIGURE 5. The upper horizontal legs of the clips overlie the horizontal legs of the flush pans 41 and prevent them from pulling up out of recess 26 when the cover plate or plates are removed to provide access to the interior of the duct. The upper legs of the clips may have openings for the passage of the heads of screws 12 or for screws 10.

It is readily apparent that the cover plates of the closure assembly may be adjusted vertically by turning screws 12 and may be moved longitudinally within the limits of slots 7. The longitudinal adjustment provides a means for insuring that the joint between two cover plates will be located at the same place as the joint between two rows of floor tile. Additionally, the longitudinal adjustment makes it possible to fit a spacer between a pair of cover plates if a metal strip is used in the floor design or if a partition is needed.

From the foregoing, it can be readily seen that a trench duct assembly constructed and installed according to the invention may be readily and inexpensively manufactured and quickly and simply installed. It enables complete access to the interior of the duct, thereby simplifying the laying of wiring and does not create an ungainly or offensive appearance in the finished floor. All parts of the trench duct assembly may be made from relatively light and inexpensive materials. The cover plates can be installed and adjusted both before and after the concrete floor has been poured without any time consuming measurements, a level being all that is necessary for perfect adjustment. If floor covering material is laid over the duct, the only visible part of the closure assembly are the top edges of the finished flush pans which may be less than ⅛" wide. Furthermore, the flush pans do not protrude above the floor covering in such a manner as to be likely to cause a person to trip over the edges of the pans.

While the preferred embodiment of this invention has been shown and described, it may be otherwise embodied within the scope of the appended claims.

We claim:

1. A trench duct assembly for wiring distribution systems comprising a duct and an adjustable closure assembly; said duct including a pair of upstanding side walls with an outwardly and upwardly extending substantially right angle portion at their upper edge, the outwardly extending wall of said right angle portions having a plurality of elongated slots formed therein; and said cover assembly includes a nut slideably supported in each of said slots, an adjusting rim supported in each of said right angle portions by means of adjusting screws threaded into said nuts, and a cover plate secured in position on said adjusting rims, whereby said cover plate is longitudinally movable along said duct by sliding said nuts in said slots.

2. A trench duct assembly according to claim 1, wherein said adjusting rims have a vertical flange and a horizontal web, said horizontal webs overlying said outwardly extending walls and having a plurality of inwardly opening notches formed therein, each of said notches being aligned with a portion of a slot in said outwardly extending walls, and a groove in the head portion of each adjusting screw dimensioned to receive said inwardly opening notches and thereby support the rims on the screws; and wherein said closure assembly further includes means holding said nuts against vertical movement in the slots in said outwardly extending walls; and holes in said cover plate aligned with said adjusting screws, whereby said cover plate may be adjusted vertically while in position on the adjusting rims by rotating said adjusting screws in said nuts.

3. A trench duct assembly according to claim 2 wherein the lower ends of said nuts extend below said outwardly extending walls; and said means holding the nuts against vertical movement comprising annular lips on the upper ends of said nuts, flat plates having a width greater than the width of said slots and being substantially the same length as said adjusting rims located between said outwardly extending walls and said lips, annular guide members located below said outwardly extending walls in surrounding relationship with the exterior of said nuts and spring clips on said nuts below said lower guide members to hold said lower guide members snugly against the lower surface of said outwardly extending walls to prevent vertical movement of said nuts, said nuts extending through said plates so that all of said nuts move simultaneously upon the longitudinal movement of said plates.

4. A trench duct assembly according to claim 3 wherein said duct includes elongated protection members attached to the outer surfaces of the duct side walls and the outwardly extending walls of said substantially right angle portions; said members, said side walls and said outwardly extending walls forming a pair of longitudinal cavities extending substantially throughout the length of said duct in surrounding relationship with the downwardly extending portions of said nuts in order to protect said nuts from contact with concrete.

5. A trench duct assembly according to claim 1 wherein said adjusting rims have a vertical flange extending above the upper edge of the upwardly extending walls of said substantially right angle portions of said duct; and a U-shaped member loosely fitted over the vertical surface of said flanges, whereby concrete will adhere to said U-shaped member above the top of said upwardly extending walls rather than to the associated flange.

6. The combination of a trench duct for use in wire distribution systems and an adjustable closure assembly; said trench duct including a pair of upstanding walls having outwardly and upwardly extending right angle portions at their upper edge, the outwardly extending walls of said right angle portions having a plurality of slots formed therethrough; and said closure assembly including a T-nut slideably supported in each of said slots; a plurality of pairs of opposed elongated adjusting rims having a vertical flange and a horizontal web located in said right angle portions, said horizontal webs having a plurality of inwardly opening notches spaced along their length and aligned with the slots in said outwardly extending walls; an adjusting screw with a grooved head fitted into each of said notches with the portion of said head above and below the groove contacting the upper and lower surface of said web adjacent the notch, the lower end of said adjusting screws extending into threaded engagement with the T-nut located therebelow so that rotation of said adjusting screws will raise or lower said adjusting rims; and a cover plate fixedly supported on the upper surface of each pair of opposed rims, said cover assembly being longitudinally movable by sliding said T-nuts in the slots in said outwardly extending walls and said cover plate being vertically adjustable by rotation of said adjusting screws.

7. A trench duct and closure assembly according to claim 6 wherein said closure assembly includes a back-up member attached to the bottom surface at one end of each cover plate, said back-up member extending a sufficient distance beyond the end of the plate to which it is attached to underlie the end of the adjacent plate, and a gasket positioned between said back-up member and said plates to prevent water from passing through the joints between adjacent plates into said duct.

8. The combination of the trench duct and an adjustable closure assembly for use in underfloor wire distribution systems; said trench duct including a bottom wall and a pair of upwardly extending side walls, the upper portion of each of said side walls having an outwardly extending horizontal leg and an upwardly extending vertical leg forming an offset portion throughout the length of the duct; a plurality of elongated slots formed in said horizontal legs; and said adjustable closure assembly including a nut supported in each of said slots for sliding movement between the slot ends; an adjusting screw held in each of said nuts and extending upwardly therefrom; T-shaped adjusting rims having a vertical flange and a horizontal web supported by said adjusting screws; and a cover plate removably attached to the upper surface of the webs, whereby said cover plate may be adjusted vertically by said adjusting screws and said closure assembly may be adjusted longitudinally by sliding said nuts in said slots.

9. A trench duct assembly comprising a duct and an adjustable closure assembly; said duct including side walls having their upper portion in the shape of a right angle, said right angle portions opening inwardly for receiving opposed adjusting rims, the bottom wall of each right angle portion having a plurality of slots formed therein; and said adjustable closure assembly comprising a nut supported for longitudinal movement in each of said slots; adjusting rims located in said right angle portions, said adjusting rims having a vertical flange and a horizontal web; a plurality of notches formed in said webs, each of said notches being positioned above one of said nuts; adjusting screws threadedly engaging said nuts, said adjusting screws having a groove dimensioned to receive a notch in the horizontal webs of the adjusting rims, whereby rotation of said adjusting screws will raise and lower the adjusting rims; an L-shaped flush pan resting on the web of each rim, the vertical legs of the flush pans terminating in the same horizontal plane as the flanges of said adjusting rims; and a cover plate resting on the flush pan and fastened to the rims.

10. A trench duct assembly comprising a duct and an adjustable closure assembly, said duct including side walls having their upper portion in the shape of a right angle, said right angle portions opening inwardly for receiving opposed adjusting rims, the bottom wall of each right angle portion having a plurality of slots formed therein; and said adjustable closure assembly comprising a nut supported for longitudinal movement in each of said slots; adjusting rims located in said right angle portions, said adjusting rims having a vertical flange and a horizontal web; a plurality of notches formed in said webs, each of said notches being positioned above one of said nuts; adjusting screws threadedly engaging said nuts, said adjusting screws having a groove dimensioned to receive a notch in the horizontal webs of the adjusting rims, whereby rotation of said adjusting screws will raise and lower the rims; an L-shaped flush pan resting on the web of each rim, the vertical legs of said flush pans extending above the upper edges of the flanges of the adjusting rims a distance equal to the thickness of a floor covering material to be used adjacent said vertical legs; clip members fitted over said horizontal webs and contacting the horizontal legs of said L-shaped flush pans to hold said flush pans in position on said webs; and a cover plate resting on the clip members and fastened to said adjusting rims.

11. An adjustable closure for wire distributing trench ducts having open tops to provide access to the interior of the duct, said closure comprising a pair of parallel adjusting rims adapted to lie at opposite sides of the open top of the duct, each of said rims having a vertical flange and a horizontal web, a plurality of inwardly opening slots spaced along said webs; adjusting screws having grooves in their heads dimensioned to receive said slots in the webs of said adjusting rims; nuts threadedly connected to the ends of said adjusting screws below the webs of said rims, said nuts adapted to be supported for sliding movement by the periphery of the open top of the trench duct; and a cover plate removably supported on said adjusting rims.

No references cited.